United States Patent

Brierley

[11] 4,021,952
[45] May 10, 1977

[54] EARTAGS

[76] Inventor: Cuthbert Brierley, Lower Hitch, Whitchurch Hill, near Pangbourne, Reading, Berkshire, England

[22] Filed: Nov. 11, 1975

[21] Appl. No.: 631,177

[30] Foreign Application Priority Data

Nov. 19, 1974 United Kingdom ............. 50136/74
Jan. 15, 1975 United Kingdom ............. 1711/75

[52] U.S. Cl. ............................................. 40/301
[51] Int. Cl.² ......................................... G09F 3/00
[58] Field of Search ............... 40/300, 301, 302; 128/329, 330

[56] References Cited

UNITED STATES PATENTS 3,731,414  5/1973  Murphy et al. .................. 40/301
3,831,597  8/1974  Shiller ............................. 128/330

*Primary Examiner*—Louis G. Mancene
*Assistant Examiner*—John H. Wolff
*Attorney, Agent, or Firm*—Edward F. Connors

[57] ABSTRACT

An eartag for cattle or other animals comprises an apertured female tab of soft plastics material and a male tab also of soft plastics material having an upstanding stem with a hollow bore, the stem having an enlarged head. A metal pin with a head larger than the head on the stem, the head being formed with a conical point, is inserted in the bore to stiffen the stem and enables the stem to be driven through the animal's ear and secured in the aperture in the female member. The pin is withdrawn leaving an eartag formed wholly of soft plastics material.

5 Claims, 2 Drawing Figures

EARTAGS

BACKGROUND OF THE INVENTION

1. Field of the Invention

This invention relates to eartags for making livestock such as cattle, sheep, pigs and other animals.

2. Prior Art

Eartags for making livestock have been used for many years and many types have been proposed and used. Amongst the requirements for an eartag are that it can be readily fitted to the animal without injury thereto and that in use it should not be a cause of disease to the ear. It is essential that the tag should remain attached to the ear and should not pull out through engagement with snags, wire or the like. The tag should also be weatherproof so that it will not deteriorate and will remain visible.

In recent years eartags have most commonly been made of plastics material rather than metal. Such materials can readily be made weatherproof and permit of the use of various different colours for tags thereby facilitating identification. Also it is possible clearly to mark a tab of an eartag of plastics material with identification characters, e.g., letters or numbers, in a colour contrasting with the main part of the tab.

In particular identification tags of the kind described in U.S. Pat. No. 3214856 are widely used. These tags comprise a pair of separate tabs to lie flat one on each side of the part of the animal to which the tag is to be attached, one of the tabs having a single upstanding, headed spike to pass through the part of the animal to which the tag is to be attached, and the other of the tabs having a hole to receive the spike with the head of the spike entered through the hole and preventing the withdrawal of the spike from the hole, thereby of the tag to join the tabs together, said spike on the one tab and said hole in the other tab being offset from the centre of the tab towards one edge thereto to an extent such that, in use of the tag, the tabs swing round with the spike as an axis to disengage entanglements. The head of the spike is a conical tip which co-operates with the hole in the female tab to enable the eartag to be applied to the animal in a single operation. When the tag is applied to the animal, by means of a pair of pliers the spike is forced through the animal's ear and through the aperture in the female tab. Thus the hole in the ear is punched and the tag applied in a single operation.

In order to achieve this result, the female tab must have a certain amount of resilience so that the aperture can be forced over the head. On the other hand this tab and the shank have to be quite rigid in order that it is possible to punch out the hole in the animal's ear in applying the tab. This punching out of the hole in the animal's ear is effected by means of a hard shoulder constituted by the edge of the aperture and the sharp edge at the base of the conical portion of the spike. In order to punch a clean hole, the female tab and the spike must therefore be made of a material which is as hard as possible subject only to the fact that it must be possible to force the head through the aperture. If the material used for the spike and female tab is too soft, it may not be possible to punch a hole through the animal's ear. It will be appreciated that the ears of animals such as cattle and pigs are formed of fairly hard gristle. It is essential that the hole should be punched cleanly and not merely produced by a tearing action. If there is not a clean hole, it will not heal rapidly and cleanly after the tag is applied. Necrosis may set in, causing not only suffering to the animal but also ultimately loss of the eartag.

For these reasons, in the above-described prior construction, the material of the female tab and spike must be made as hard as possible suject only to the requirement that the conical head can be forced through the aperture. The dimensional tolerances are made such that the head is only just slightly larger than the aperture, just sufficient to ensure that the female tab is retained on the spike. Even so the choice of the material is very critical and, in practice, very hard nylon has to be used. It is a material which the layman would immediately describe as a rigid material. For instance the female tab cannot be bent manually.

The use of plastics material, provided the material is suitably chosen, enables the tag to be made weatherproof. In order to prevent the tags from pulling out through engagement with snags, wire, netting or fences, in the type of eartag described above, the two tabs are made relatively rotatable. It is also essential, in this prior type of eartag, that these two tabs should be quite small because, the smaller the tab, the easier it will pull clear.

Eartags made of hard nylon material, as described above, have been very extensively used for the marking of cattle, sheep, pigs and other animals. The use of a much softer material for the tab portions, such that they would flex easily and so bend or fold if caught in a snag, would be advantageous. Because the eartag is less likely to be trapped in an obstruction, larger tabs can be used, making them more readily visible. This has led to the making of an eartag of two different materials, one rigid and the other soft. British patent specification No. 1320454 is an example of such an eartag in which the female member is made of soft material and the male member of hard material. To make the male tab of soft material leads to a three-part construction as in British patent specification No. 1372769. These constructions necessarily have a stiff spike in order to enable the eartag to be applied to the animal in a single operation without prior punching of a hole.

In order to make the spike flexible, it has been proposed to form a tag with the spike as a hollow stem integral with the male tab and having a metal head, the pliers for applying the eartag having, on one jaw, a pin which, in use, extends up the bore of the spike to engage the head and stiffen the spike; one such arrangement is described in British patent specification No. 1394268 in which this pin has a pointed end and extends through the metal head. Such constructions have a number of disadvantages. The metal head has to be partly encased in plastics material with the result that there is no hard shoulder on the spike for punching a hole through the ear. Also, because of the absence of a hard shoulder, the lip for retaining the spike in the aperture of the female tab must be narrow, so making it easy to disengage the two parts of the tab. It is necessary to make the female part grip the male spike, preventing any relative movement. As a result, hairs may be trapped. This, together with tearing as a result of poor punching may cause necrosis. A further problem arises because of the pin on the plier jaw; the tag cannot be withdrawn from the pliers until the jaws are fully open and any sudden movement of the animal before then may result in the pin being broken off.

SUMMARY OF THE INVENTION

It is an object of the present invention to provide an improved form of eartag in which the whole tag can be moulded of soft plastics material and can be applied to the animal in a single operation yet in which the above-described problems are avoided.

According to the present invention an animal identification eartag comprises a male tab and a female tab, the male tab having an integral stem normal to the plane of the tab, the male tab and stem and the female tab being formed of a flexible plastics material, the female tab having a circular aperture and the stem on the male tab having an axial bore extending along the whole of its length and having a shank of smaller diameter than said aperture, the shank of the stem at the end remote from the male tab having a head which head is of larger cross-section than the shank of the stem to form a shoulder between the head and the shank of the stem, the aperture in the female tab being slightly smaller than the size of the head.

This eartag is used in combination with a removable rigid pin having a head with a pointed end, conveniently a metal pin, which is inserted in the bore of the stem to stiffen the stem and thereby enable the eartag to be applied to the animal in the know way. The pin head has a diameter at least equal to and preferably slightly greater than the diameter of the head of said stem. The stem with the pin form a spike co-operating with the female member to punch a hole in the ear, the two parts of the tag being secured together in a single operation. The pin is then withdrawn leaving the eartag comprising the male and female members attached to the animal. Both these members are formed wholly of flexible plastics material. With this construction, unlike previous eartags, the male and female members are both integral mouldings of one material. The stem is flexible as well as the tab portions.

The invention furthermore includes within its scope the combination of the eartag described above with a rigid pin inserted in the bore of the stem to stiffen the stem. Conveniently this pin is of such length that, when the pointed end protrudes from the end of the stem remote from the male tab, the other end protrudes beyond the outer surface of the male tab. With this construction, the pliers for applying the eartag can have a recess in the male tab jaw, the recess receiving the protruding part of the pin to hold it rigidly.

The pointed top of the pin is preferably a conical tip with a maximum diameter equal to but preferably slightly greater than (e.g., 0.5 mm greater than) the diameter of the head on the stem.

With this construction, the head on the stem, when the stem is reinforced by the rigid pin, can be forced through the aperture in the female tab and will be retained thereon after the shoulder has passed through the aperture provided the shank is stiffened by the pin when punching the hole in the ear and passing through the aperture in the female tab. The female tab is then held on the shank by the head on the end of the stem. After the tag has been applied to the animal, the pin is withdrawn. Unlike prior constructions, this eartag has an integral stem and male tab wholly of flexible material and also has a wholly flexible female tab. The material forming the two parts can be so flexible that the stem and each of the tabs can readily be bent by manual pressure. The flexible tabs can readily pull out of snags by deforming and thus they can be made much larger than conventional eartags thereby greatly facilitating the ease with which an animal can be identified. More particularly however, the flexibility of the stem facilitates the withdrawal of the tag from entanglements. The stem can readily bend for this purpose. The aperture in the female member is preferably made with sufficient clearance around the shank of the stem to allow the female member to slide and rotate freely on the stem.

The invention furthermore includes within its scope a method of fixing, to an animal, an eartag of the kind comprising a male member and a female member, the male member having a tab portion and a stem with a head upstanding from the tab portion and the female member having a tab portion with an aperture slightly smaller than the size of the head, which method is characterised in that a rigid pin having a pointed head is inserted in a bore extending along the whole length of the stem which is formed of flexible plastics material, the pointed head of the pin protruding from the head end of the stem, the maximum diameter of the head of the pin being greater than the maximum diameter of the stem, the heads of the pin and stem then being forced, in a single operation, through the ear of the animal and through the aperture in the female tab, and the pin then being withdrawn to leave an eartag formed wholly of flexible plastics material on the animal.

The male and female elements may be a tough plastics, rubber or other flexible material. A number of synthetic plastics are suitable. Such material can readily bend so that there is no risk of the tag being pulled out of the ear if it gets caught in a snag; the tab or tabs deform and can readily be pulled clear.

Identification characters may be marked on one or both tabs. The tabs may be of any convenient shape for example circular, elliptical, rectangular, triangular etc.

The tabs may be made so that they are relatively rotatable and the stem on the male member and the aperture in the female member may each be offset from the centre towards an edge of their respective tabs; if the tabs are elongate, the stem and aperture may each be near one end of the respective tabs. This construction causes the tabs to rotate relatively about the stem axis when the animal pulls to clear the eartag from a snag. However, because of the use of the flexible material for the tabs, such relative rotation is not essential for enabling the eartag to pull clear of snags. The tabs may be of uniform width over part of their length. Preferably the remaining parts of their sides converge to a rounded end centred on the spike or aperture.

DESCRIPTION OF THE PREFERRED EMBODIMENTS

The eartag, in the illustrated construction, comprises a male member having a tab portion 10 and an integral stem 11 and a female member 12. In applying to an animal, a metal pin 13 is used, this pin subsequently being withdrawn.

Figure 1:
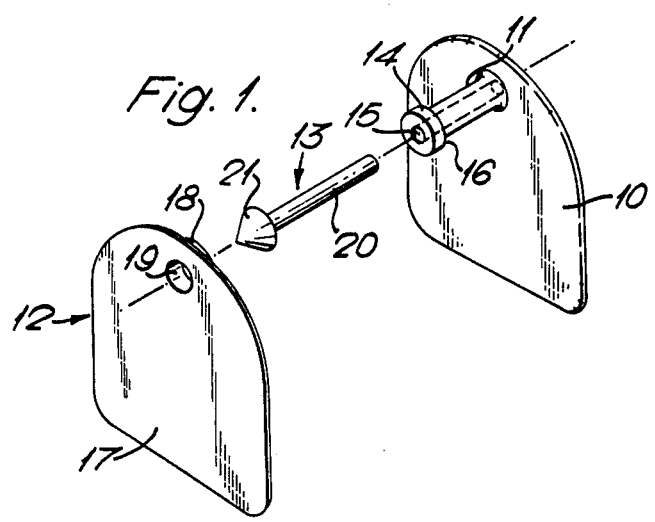
FIG. 1 is an exploded perspective view of one example of an eartag according to the invention for cattle or pigs.
Figure 2:
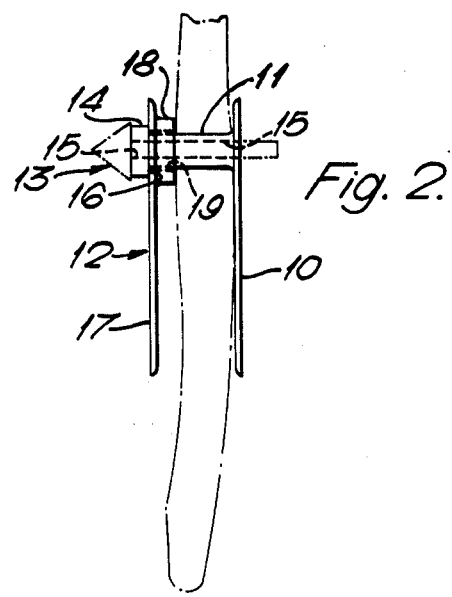
FIG. 2 is a side elevation of the eartag of FIG. 1 as assembled together but before withdrawal of the pin

The male member has a tab portion 10 which is formed of a flat uniform thickness flexible tough synthetic plastics material. This tab portion 10 is marked with identification characters, for example by using a marking ink or by depressions or raised portions. The tab portion 10 is generally semicircular at one end but, in this particular embodiment is, apart from the semicircular portion of generally rectangular form with rounded corners. The edges of the tab may be chamfered. The stem 11, which is moulded integrally with the tab portion 10, is near one end of the tab, being located in this embodiment at the centre of the semicircular portion of the tab and comprises a uniform diameter shank with an enlarged head 14 on one end. A bore 15 extends the whole length of the shank and through the head. As is most clearly seen in FIG. 2, the head in axial section forms a frustum of a cone and thus provides a shoulder 16 facing the tab portion 10, the shoulder extending in a plane normal to the axis of the stem.

The female member 12 has a tab which is, in this particular embodiment, similar in shape and size to the male tab portion 10. As previously explained however the tab portions need not be of the same size. The female member is made by moulding a flexible plastics material which may be the same material as that used for the male member. The female member consists essentially of a flat tab portion 17 with a raised cylindrical boss 18 having a central aperture 19 therethrough, the aperture being located at the center of the semicircular end portion of the tab.

In applying the eartag to an animal, a rigid pin 13 is employed. This pin is formed of metal for example steel although any other suitable rigid material may be employed. It has a shank 20 of uniform diameter which fits freely in the aforementioned bore 15, the shank having at one end a conical head 21, the larger diameter end of which is slightly larger in diameter than the outer end of the head 14 on the stem 11. The length of the pin 13 is such that when the pin is put in the bore in the stem with the conical point 21 seating on the head 14, the other end of the pin protrudes beyond the outer surface of the tab 10.

The eartag is attached to an animal by using a pair of pliers in a manner similar to that employed for hard plastics two-part eartags of the well-known kind previously described. The metal pin 13 is put in the bore 15 in the stem and the male member is then put in one jaw of the pliers. The female member is put in the other jaw of the pliers. The jaw of the pliers which receives the male tab has a recess to receive and firmly locate the part of the pin which protrudes beyond the outer face of the male tab. Thus the pin 13 and stem 11 form a rigid spike which is rigidly located whilst the tag is being applied to the animal. The pliers are operated to force the spike through the animal's ear and thence through the aperture 19 in the female member. The aforementioned shoulder 16 then prevents withdrawal of the stem through the hole in the female member. The hard metal tip 21 on the pin enables a clean hole to be punched in the ear. The rigid pin stiffens the stem during the punching operation so ensuring that the point of the pin is correctly aligned with the aperture in the female tab. A hole is punched through the ear, the hole being of slightly larger diameter than the shank of the stem 11. The shank of the stem is sufficiently long to ensure that the ear is not pressed between the tabs 10, 17 of the male and female members.

The flexibility of the two tabs enables the eartag readily to pull clear of snags. The use of the soft flexible material for the male tab enables it to bend freely under slight pressure so that it can fold on itself longitudinally or otherwise deform. This further assists in enabling the eartag to pull clear of snags. Because of this greater ability to pull clear of snags, the male tab may be made larger than is customary with conventional eartags of hard plastics material thereby enabling much larger identification characters to be employed. It is readily possible to make the female part of the eartag a loose fit on the shank of the stem 11, so that the two tabs can swing freely relatively to one another and so that the female member is a loose sliding fit on the shank of the stem 11 thereby ensuring that the tabs cannot apply pressure to the ear.

After the eartag has been applied to the animal, the pin 13 is withdrawn. A single pin therefore can be used in succession for applying a number of eartags to animals.

I claim:

1. An animal identification eartag comprising a male tab, a female tab and a removable rigid pin, the male tab having an integral stem normal to the plane of the tab, the male tab and stem and the female tab being formed of a flexible plastics material, the female tab having a circular aperture and the stem on the male tab having an axial bore extending along the whole of its length with the stem being of smaller diameter than the aperture, in the female tab, the stem having an outer free end remote from the male tab and formed with a head which head is of larger cross-section than the stem to form a shoulder between the head and the stem, the aperture in the female tab being slightly smaller than the size of the head, and said pin comprising a shank portion having a conical head with a pointed tip, said shank portion of the pin being insertable in the bore of the stem to stiffen the stem, the outer diameter of the head of said pin being at least as great as the diameter of the head of said stem.

2. An eartag as claimed in claim 1 wherein the stem on the male member and the aperture in the female member are each offset from the center towards one edge of their respective tabs.

3. An eartag as claimed in claim 4 wherein the pin is of such length that, when the pointed head protrudes from the end of the stem remote from the male tab, the other end of the shank portion of the pin protrudes beyond the outer surface of the male tab.

4. An eartag as claimed in claim 1 wherein the male and female tabs are formed of a tough plastics or rubber or other flexible polymer material.

5. A method of fixing to an animal, an eartag of the kind comprising a flexible male member and a flexible female member, the male member having a tab portion and a stem with a free end upstanding from the tab portion and the female member having a tab portion with an aperture slightly smaller than the size of the free end, which method is characterized in that a rigid pin having a conical head is inserted in a bore extending along the whole length of the stem, the head of the pin protruding from the free end of the stem, the maximum diameter of the head of the conical pin being greater than the maximum diameter of the free end of the stem, the free end of the pin and the head of the stem then being forced, in a single operation, through the ear of an animal and through the slightly smaller aperture in the female tab, and the pin then being withdrawn through the female tab in the same direction as inserted so as to leave an eartag formed wholly of flexible material on the animal.

* * * * *